United States Patent

[11] 3,607,945

| [72] | Inventor | Jack E. Reece |
| | | Bartlesville, Okla. |
| [21] | Appl. No. | 781,239 |
| [22] | Filed | Dec. 4, 1968 |
| [45] | Patented | Sept. 21, 1971 |
| [73] | Assignee | Phillips Petroleum Company |

[54] HYDROCARBYLTHIOALKANETHIOLS
4 Claims, No Drawings

[52] U.S. Cl.................................................. 260/609 A,
71/98, 260/93.5 R, 260/93.7, 260/94.4, 260/455
C, 260/502.6, 260/609 D, 424/301, 424/337
[51] Int. Cl....................................................... C07c 149/06,
C07c 9/12
[50] Field of Search............................................ 260/609 A,
609 D

[56] References Cited
UNITED STATES PATENTS

| 3,270,063 | 1966 | Fath et al...................... | 260/609 |
| 2,490,985 | 1949 | Snyder et al................... | 260/609 |
| 2,490,984 | 1949 | Snyder et al................... | 260/609 |

FOREIGN PATENTS

| 191,543 | 1967 | U.S.S.R....................... | 260/609 |

Primary Examiner—Charles B. Parker
Assistant Examiner—D. R. Phillips
Attorney—Young and Quigg ABSTRACT: Hydrocarbylthioalkanethiols, e.g., 6-(t-butylthio)-1-hexanethiol, are prepared by the reaction of hydrocarboncarbothiolic acids, e.g., thiolacetic acid, with hydrocarbylthioalkenes, e.g., 6-(t-butylthio)-1-hexene, to provide hydrocarbylthioalkyl hydrocarbonthiolates, e.g., 6-(t-butylthio)-1-hexyl methanecarbothiolate, followed by conversion with a base to provide said thiols. The hydrocarbythioalkanethiols are useful as chain transfer agents in the polymerization of monomers to form polymers, such as elastomers and the like.

HYDROCARBYLTHIOALKANETHIOLS

FIELD OF THE INVENTION

This invention relates to a method of producing novel hydrocarbythioalkyl hydrocarboncarbothiolates and novel hydrocarbylthioalkanethiols.

BACKGROUND AND DESCRIPTION OF THE PRIOR ART

The composition of matter of the invention, the hydrocarbylthioalkanethiols and hydrocarbylthioalkyl hydrocarboncarbothiolates have not been previously described nor has the method of preparation of these compounds been described by the prior art.

SUMMARY OF THE INVENTION

The process of the invention comprises reacting hydrocarboncarbothiolic acids of the formula

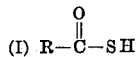

(I) R—C(=O)—SH with hydrocarbylthioalkenes of the formula (II) R-S-(CR′$_2$)$_n$-CR′=CR′$_2$ to provide hydrocarbylthioalkyl hydrocarboncarbothiolates of the formula

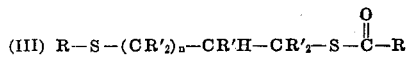

(III) R—S—(CR′$_2$)$_n$—CR′H—CR′$_2$—S—C(=O)—R

The reaction can be illustrated by the following:

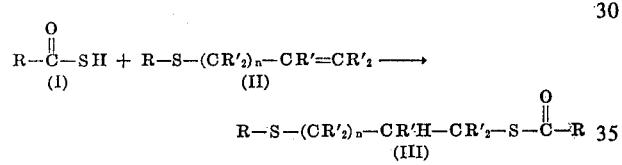

R—C(=O)—SH + R—S—(CR′$_2$)$_n$—CR′=CR′$_2$ ⟶
(I)          (II)

R—S—(CR′$_2$)$_n$—CR′H—CR′$_2$—S—C(=O)—R
(III)

hydrocarbylthioalkyl hydrocarboncarbothiolates of formula (III) are then reacted with a base to convert the compounds of formula (III) to the hydrocarbylthioalkanethiols of the formula (IV) R-S-(CR′$_2$)$_n$-CR′H-CR′$_2$-SH. The conversion reaction can be illustrated by the following:

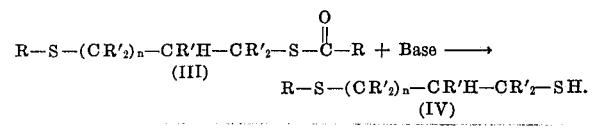

R—S—(CR′$_2$)$_n$—CR′H—CR′$_2$—S—C(=O)—R + Base ⟶
(III)
R—S—(CR′$_2$)$_n$—CR′H—CR′$_2$—SH.
(IV)

In each of the formulas above, R is alkyl, cycloalkyl, aryl, arylalkyl, arylcycloalkyl, alkylcycloalkyl, alkylaryl, cycloalkylalkyl, or cycloalkylaryl, having from 1–12 carbon atoms, R′ is hydrogen or alkyl having about 1–6 carbon atoms and the total number of carbon atoms in all R′ groups does not exceed 20; and $n$ is an integer in the range of 2–12.

DESCRIPTION OF THE PREFERRED EMBODIMENTS

Exemplary compounds of the hydrocarboncarbothiolic acid utilized as the reactant according to formula (I) are as follows:
methanecarbothiolic acid
1,1-dimethylethanecarbothiolic acid
hexanecarbothiolic acid
dodecanecarbothiolic acid
2naphthalenecarbothiolic acid
benzenecarbothiolic acid
2-toluenecarbothiolic acid
2,4-xylenecarbothiolic acid
3-cumencarbothiolic acid
mesitylenecarbothiolic acid
cyclopropanecarbothiolic acid
cyclopenthanecarbothiolic acid
cyclododecanecarbothiolic acid
2-(2-naphthyl)ethanecarbothiolic acid
2-phenylethanecarbothiolic acid
2-phenylmethanecarbothiolic acid
2-hexylbenzenecarbothiolic acid
3-methylbenzenecarbothiolic acid
4-propylbenzenecarbothiolic acid
3-hexylcyclohexanecarbothiolic acid
4-methylcyclopentanecarbothiolic acid
3-butylcyclopentanecarbothiolic acid
4-cyclohexylhexanecarbothiolic acid
cyclopropylmethanecarbothiolic acid
4-cyclopentylbutanecarbothiolic acid
4-cyclohexylbenzenecarbothiolic acid
3-cyclopropylbenzenecarbothiolic acid
4-phenylcyclohexanecarbothiolic acid
phenylcyclopropanecarbothiolic acid Exemplary hydrocarbylthioalkenes of formula (II) which are employed in the reaction are as follows;
6-(t-butylthio)-1-hexene
8-(t-butylthio)-1-octene
4-methylthio-1-butene
8-hexylthio-1-octene
7-methyl-8-ethyl-9-pentyl-10-hexyl-20-dodecylthio-7-eicosene
7-methyl-8-ethyl-9-pentyl-10-hexyl-20-dodecylthio-7-eicosene
4-cyclopentylthio-1-butene
9-ethyl-15,15-dihexyl-20-cyclodedecylthio-7-eicosene
4-phenylthio-1-butene
12-(4-biphenylthio)-4-dodecane
8-(2-indenylthio)-2-octene
7-methyl-8-ethyl-9-pentyl-14-(2-methylpentyl)-20-(2-acenaphthenylthio-7-eicosene
4-(benzylthio)-1-butene
9-(1-tolylthio)-4-nonene
9-(2-ethylbutyl)-16-(2,4-xylylthio)-6-hexadecene
12-ethyl-15-(3-cumenylthio)-7-heptadecene
8-(mesitylthio)-1-octene
13-ethyl-16,17-diphenyl-20-cycloundecyl-methylthio-7-eicosene
7-cyclopentylmethylthio-2-heptene
9-ethyl-15,19-dihexyl-20-[2-(2-naphthyl)ethylthio]-7-eicosene
14-ethyl-15,18-dihexyl-20-(2-hexylphenylthio)-7-eicosene
14,15-dimethyl-15,16-dihexyl-20-(3-hexylcyclohexylthio)-7-eicosene
8-ethyl-14,14-di(2-methylpentyl)-20-(6-phenyl-2-methylpentylthio)-7-eicosene
4-(2-methylcyclopentylthio)-1-butene
9-butyl-14,15-dipentyl-20-[2-(1-ethylpentyl)cyclopentylthio]-7-eicosene
10-butyl-14,18-diphenyl-20-(2,3-dimethyl-cyclodecylthio)-7-eicosene
8-(4-cyclohexylphenylthio)-3-octene
9-(4-phenylcyclohexylthio)-2-nonene
8-(4-cyclopentylphenylthio)-3-octene
9-(3-phenylcyclohexylthio)-2-nonene The hydrocarboncarbothiolic acids of formula (I) mentioned above can be prepared by conventional means well known in the art. For example, the respective anhydride can be percolated with $H_2S$ to provide the hydrocarboncarbothiolic acids. Some members such as methanecarbothiolic acid (thiolacetic acid) and benzenecarbothiolic acid (thiolbenzioc acid) are readily available items of commerce. The hydrocarbylthioalkenes of formula (II) mentioned above can readily be synthesized by many means known in the art such as by those methods disclosed in U.S. Pat. No. 3,031,391, issued Apr. 24, 1962, Rector P. Louthan; the Journal of Organic Chemistry, 27, 2439–48, (1962); and U.S. Pat. No. 2,352,435, issued June 27, 1944, Hoeffelman et al. Preferably, the hydrocarbylthioalkenes of formula (II) wherein R is a tertiary butyl radical are prepared in accordance with my copending application, Ser. No. 607,909, filed June 9, 1967 now abandoned.

The reaction of the thiolic acids (I) and thioalkenes (II) can be advantageously accomplished in the presence of free radical initiators to promote the reaction desired. Such free radical initiators as peroxides, persulfates, electromagnetic radiation, certain azo compounds and the like are well known to those skilled in the art and are employed by methods which are well known in the art. It is understood that the use of free radical initiators in the reaction is not necessary to produce the hydrocarbylthioalkyl hydrocarboncarbothiolates of the invention.

The temperature employed in the conversion of the thiolic acids (I) and thioalkenes (II) can include any temperature wherein the reactor contents are maintained substantially in the liquid phase. Preferably, temperatures in the range of about 0° C. to 120° C. are employed. Although either superatmospheric or subatmospheric pressure can be employed, atmospheric pressure is normally preferred because of convenience. However, the reaction can be effected at pressures in the range of about 0.1 to about 100 atmospheres. Ordinary reaction equipment and techniques known in the art are employed in carrying out the reaction. Diluents which are substantially completely inert to the reaction environment can be employed in amounts comprising as much as 90 weight percent of the total reaction mixture or more. Exemplary hydrocarbons which can be employed as an inert diluent comprise hydrocarbons that do not contain olefinic unsaturation and that are of a suitable molecular weight. Exemplary compounds are hexane, cyclohexane, dodecane, toluene, benzene, xylene, and the like. Other diluents such as N-methylpyrrolidone, chloroform, tetrahydropyran, dimethyl sulfoxide, sulfolane, and the like which do not deleteriously effect the conversion to the desired hydrocarbylthioalkyl hydrocarboncarbothiolates can advantageously be employed. The reaction is characterized by a substantially complete quantitative conversion of the reactants to the desired hydrocarbylthioalkyl hydrocarboncarbothiolate product. Normally, a slight molar excess of the hydrocarbon-carbothiolic acid is preferred. However, it is within the scope of the invention to utilize amounts in the range of from 0.5 to 20 mols of hydrocarboncarbothiolic acid in relation to the molar amount of the hydrocarbylthioalkene utilized.

The reaction of the hydrocarbylthioalkyl hydrocarboncarbothiolates (III) with a base to produce the hydrocarbylthioalkanethiols (IV) of the invention can advantageously be effected at any convenient temperature wherein the reactor contents are maintained substantially in a liquid phase. Generally, temperatures are in the range of about 0° to about 200° C., although either higher or lower temperatures can be employed if desired. Either subatmospheric or superatmospheric pressures may also be employed if desired. However, atmospheric pressure is normally employed because of convenience. The conversion of the hydrocarbylthioalkyl hydrocarboncarbothiolates can be effected at a pressure in the range of from 0.1 to about 100 atmospheres. Sufficient time should be employed to effect the degree of conversion desired; normally it is in the range of from about 1 minute to 16 hours.

The base employed in the conversion of the hydrocarbylthioalkyl hydrocarboncarbothiolates can be any base known to be useful to effect the conversion of an ester or thioester linkage. For example, alkali metal hydroxides such as sodium hydroxide, potassium hydroxide, lithium hydroxide or the like can be employed. Basic materials such as basic clays, basic ion exchange resins, quarternary ammonium compounds, or the like can be used.

It is within the scope of the invention to effect the conversion in the presence of an acidic hydrolysis catalyst, provided some means are used to remove the carboxylic acid formed. Such means may include fractional distillation, solvent extraction, and the like, or any other means known in the art. The preferred acidic hydrolysis catalyst which can advantageously be employed is dilute sulfuric acid.

The hydrocarbylthioalkyl hydrocarboncarbothiolates and the hydrocarbylthioalkanethiols of the invention can be separated from the reaction mixtures by any means known in the art such as distillation, solvent extraction, chromatography, filtration or the like.

The hydrocarbylthioalkyl hydrocarboncarbothiolates of the invention have utility as insecticidal agents. Utilization of the compounds in insecticidal formulations is well within the knowledge of those skilled in the art in the preparation and application of insecticidal compositions to effect control of pestiferous insects. The hydrocarbylthioalkanethiols which also exhibit some utility as an insecticidal and herbicidal ingredient are more advantageously employed as chain transfer agents (modifiers) in the polymerization of suitable monomers to form synthetic rubbers. Included are those polymers and copolymers of diolefins and 1-olefins containing form 2–8 carbon atoms per molecule, inclusive. Exemplary of such compounds are polymers and copolymers of styrene, butadiene isoprene, 1-octene, 1,3-pentadiene, 1,3-octadiene, and the like. The incorporation of the hydrocarbylthioalkanethiols of the invention within the polymerization system is well within the knowledge of those skilled in the art.

EXAMPLE I

To a stirred reactor was charged 25 g. (0.33 mol) of methanecarbothioloic (thiolacetic acid) acid. Thirty-five grams (0.2 mol) of 6-(t-butyltion)- 1-hexene was added slowly with vigorous stirring while the temperature was maintained below 50° C. When all of the 6-(t-butylthio)-1-hexene had been added and the mixture was at a temperature of about 40° C, an additional 5 g. of methanecarbothiolic acid was added to the reactor. The reaction mixture was allowed to cool to room temperature and to stand for 16 hours. After this period, the reaction mixture was vacuum distilled.

The distillation yielded 38.5 g. of material boiling at 130–132°C./0.4 mm Hg, which resulted in a yield of 76.5 mol percent based on the amount of 6-(t-butylthio)-1-hexene charged. Refractive index of the material at 20° C. was found to be 1.4953 and the density at 20° C. was found to be 0.977. Theoretical carbon and hydrogen content for the compound 6-(t-butylthio)-1-hexyl methanecarbothiolate is 58 percent carbon and 9.74 percent hydrogen. Elemental analysis for the product was 57.9 percent carbon, 9.9 percent hydrogen. These values confirm the structure of the compound as named.

The above example clearly demonstrates the synthesis of a hydrocarbylthioalkyl hydrocarboncarbothiolate from a hydrocarbylthioalkene and a hydrocarboncarbothiolic acid.

EXAMPLE II

To a stirred reactor was charge 8.4 g. (0.15 mol) of potassium hydroxide in a solution comprising 150 ml. of 95 weight percent methanol and 5 weight percent water. The mixture was cooled to 20° C. and 24.8 g. (0.1 mol) of 6-(t-butylthio)-1-hexyl methanecarbothiolate prepared in Example I was added to the cooled mixture. Stirring was continued for 90 minutes and the temperature rose to room temperature. Three hundred ml. of water was added and sufficient dilute sulfuric acid was added to bring the pH to a value of 2. The resulting mixture was extracted with ethyl ether, the extract washed with water and subsequently dried with MgSo$_4$. The dried extract was stripped of volatiles thereby leaving an oily product.

The oily product was distilled under reduced pressure and 12.4 g. of a fraction boiling at 111° C./1.1 mm. Hg was recovered. Refractive index at 20° C. of the product was found to be 1.4939 and the density of the product at 20° C. was 0.933. Theoretical composition for 6-(t-bulylthio)-1-hexanethiol is 58.25 percent carbon and 10.75 percent hydrogen. Elemental composition of the product recovered as determined by analysis was 58.1 percent carbon and 10.9 percent hydrogen, thus confirming the structure of the compound as named.

This example clearly demonstrates the preparation of a hydrocarbylthioalkanethiol by reacting a hydrocarbylthioalkyl hydrocarboncarbothiolate with a base.

EXAMPLE III

To a stirred reactor was charged 42 g. (0.55 mol) of methane carbothiolic acid. About 66 g. of 8-(t-butylthio)-1-octene was slowly added during a period of about 50 minutes. The temperature rose to 38° C. Additional 8-(t-butylthio)-1-octene was then slowly added over an additional 15 minute period to effect the total addition of 100 g. (0.5 mol) of the 8-(t-butylthio)-1-octene. The reactor contents were maintained at 38° C. for an additional 10 minutes. The temperature was then slowly raised to 80° C. At this point the temperature rose to 97° C. Heating was discontinued and the mixture was allowed to cool to room temperature.

The mixture was distilled under reduced pressure and a fraction weighing 108.5 g. (78 mol percent yield based on the amount of 8-(t-butylthio)-1-octene charged) was recovered at 140–142Φ⅛ C./0.35 mm. Hg. Refractive index at 20° C. was 1.4927 and density at 20° C. was 0.9610. Theoretical composition calculated for 8-(t-butylthio)-1-octyl methanecarbothiolate is 60.80 percent carbon, 10.22 percent hydrogen, and 23.20 percent sulfur. Elemental composition of the product determined by analysis was 61.0 percent carbon, 10.35 percent hydrogen, and 23.40 percent sulfur, this confirming the structure of the compound as named above.

This example again demonstrates the preparation of hydrocarbylthioalkyl hydrocarboncarbothiolates of the invention by reacting a hydrocarbylthioalkene and a hydrocarboncarbothiolic acid.

EXAMPLE IV

To a solution comprising 11.2 g. (0.2 mol) potassium hydroxide, 95 g. methanol and 5 g. of water, 41.5 g. (0.15 mol) of the 8-(t-butylthio)-1-octyl methanecarbothiolate prepared in Example III was added. The mixture was stirred for 1 hour and then acidified to a pH of 2 with dilute sulfuric acid. Two hundred ml of water was added to the mixture. The mixture was extracted with ethyl ether, the ether extracts were washed with water and subsequently dried over $MgSO_4$. The dried extract was then stripped of volatiles.

The extract was distilled under reduced pressure yielding 31.3 g. (89 mol percent based on the amount of 8-(t-butylthio)-1-octyl methanecarbothiolate charged) of a fraction boiling at 110° C./0.22 mm. Hg, having a refractive index at 20° C. of 1.4911 and a density at 20° C. of 0.9219. Elemental composition calculated for 8-(t-butylthio)-1-octanethiol is 61.5 percent carbon, 11.2 percent hydrogen, and 27.4 percent sulfur. Elemental composition found by analysis for the product was 61.5 percent carbon, 11.3 percent hydrogen, and 27.5 percent sulfur. These values are in excellent agreement with the theoretical and thus confirm the structure of the compound as named.

This example clearly demonstrates another preparation of the hydrocarbylthioalkanethiols of the invention by the reaction of a hydrocarbylthioalkyl hydrocarboncarbothiolate with a base.

EXAMPLE V

In order to demonstrate the utility of the thiol compounds of the invention, a butadiene/styrene copolymer was prepared in an emulsion-type recipe employing the 8-(t-butylthio)-1-octanethiol prepared in Example IV as the modifier. A control run was made using the same recipe employing tert-dodecylmercaptan (Sulfole 120) as a modifier. The polymerization recipe was as follows:

Polymerization Recipe

|  | Parts by weight |
|---|---|
| 1,3-Butadiene | 70 |
| Styrene | 30 |
| Water | 180 |
| Dresinate 554 (a) | 4.6 |

Table—Continued

|  |  |
|---|---|
| KOH | 0.125 |
| KCl | 0.30 |
| Daxad (b) | 0.20 |
| Questex 4SW (c) | 0.032 |
| $FeSO_4 \cdot 7H_2O$ | 0.010 |
| $NaSO_2CH_2OH \cdot 2H_2O$ | 0.050 |
| p-Menthane hydroperoxide | 0.063 |
| Modifier (d) | variable |
| Shortstop: Thiostop N (e) | 0.16 |
| Antioxidant: Polygard (f) | 1.5 |
| Temperature, °F. | 41 |
| Time, hours | variable |

(a) Potassium salt of a disproportionated rosin acid.
(b) Sodium salt of polymerized alkyl naphthalenesulfonic acid.
(c) The tetrahydrate of the tetrasodium salt of ethylenediamine tetraacetic acid. One-half added in soap solution (KOH, KCl, Daxad 15 and Dresinate 554 in water) and one-half in activator solution ($FeSO_4 \cdot 7H_2O$ and $NaSO_2CH_2OH \cdot 2H_2O$ in water).
(d) Sulfole 120 = tert-dodecyl mercaptan. $(CH_3)_3CS(CH_2)_8SH$
Sodium dimethyldithiocarbamate. (f) Tri(nonylphenyl)phosphite.

Charge Order: soap solution, styrene, butadiene, modifier (see below for details of incremental addition of $(CH_3)_3CS(CH_2)_8SH$. All of the tert-dodecyl mercaptan was added at this point), p-menthane hydroperoxide, adjust temperature to 41° F. for 25 minutes, activator solution.

TABLE I

| Run No. | Modifier (phm) (a) | Time Hours | Conv. % | I.V. (b) | Mooney ML-4 (c) |
|---|---|---|---|---|---|
| 1 | $(CH_3)_3CS(CH_2)_8SH$ (0.299) (d) | 7.0 | 59 | 2.13 | 44 |
| 2 | tert-$C_{12}SH$ (0.186) | 7.1 | 61 | 2.05 | 52 |

(a) Phm = parts by weight per 100 parts by weight of monomers.
(b) Determined according to the procedure of U.S. 3,278,508, column 20, notes (a) and (b). Polymers were gel-free.
(c) ASTM D 1646–63.
(d) 0.0748 phm added at 0, 15, 33 and 49 percent conversion.

The above polymers were isolated by first adding antioxidant to the shortstopped reactions, then coagulating with salt/acid at a pH of 3 to 4. Recovered polymers were washed once at room temperature, then three times at 50–60° C. and dried overnight at 155° F. in an air oven.

The above polymers were compounded in a conventional rubber recipe. The compounding recipe and results are shown below.

Compounding Recipe

|  | Parts by weight |
|---|---|
| Polymer | 100 |
| IRB-02 Carbon black (a) | 50 |
| Philrich 5 (b) | 10 |
| Zinc oxide | 3 |
| Stearic acid | 1 |
| Flexamine G (c) | 1 |
| Sulfur | 1.75 |
| Santocure (d) | 1.2 |

(a) Industry reference black, high abrasion furnace type.
(b) Highly aromatic oil, type 101 under ASTM D 2226–63T.

(c) A mixture containing 65 percent of a complex diarylamine-ketone reaction product and 35 percent of N,N'-diphenyl-p-phenylenediamine.
(d) N-cyclohexyl-2-benzothiozolesulfenamide.

TABLE II

Processing Properties

|  | Polymer from | |
| --- | --- | --- |
|  | Run No. 1 | Run No. 2 |
| Compound Mooney, ML—4 (a) | 54 | 58 |
| Extrusion—250° F., (b) Garvey | | |
| inches/min. | 44 | 42 |
| g./min. | 113 | 110 |
| Rating (Garvey, 12 best) | 11 | 11– |

Physical Properties (Cured 30 min. at 307° F.)

| 300° Modulus, p.s.i. (c) | 1,170 | 1,100 |
| --- | --- | --- |
| Tensile, p.s.i. (c) | 3,710 | 4,040 |
| Elongation, p.s.i. (c) | 665 | 680 |
| ΔT, °F. (d) | 83.5 | 77.2 |
| Resilience, % (e) | 59.2 | 62.4 |
| Shore A Hardness (f) | 58 | 58 |

(a) ASTM D 1646–63
(b) Ind. Eng. Chem., 34, 1309 (1942)
(c) ASTM D 412–62T
(d) ASTM D 623–62
(e) ASTM D 945–59
(f) ASTM D 1706–61

This example clearly demonstrates the utility of the hydrocarbylthioalkenethiols as modifiers in a polymerization system.

EXAMPLE VI

To demonstrate the utility of the hydrocarbylthioalkyl hydrocarboncarbothiolates of the invention, the 8-(t-butylthio)-1-octyl methanecarbothiolate produced in Example III was tested for its insecticidal effectiveness on the Mexican Bean Beetle (Epilachna varivestis).

In the Mexican Bean Beetle spray test, the effectiveness of the 8-(t-butylthio)-1-octyl methanecarbothiolate as applied to one-day old larvae of the beetle was accomplished as follows.

Paired fully expanded primary leaves were excised from Pinto bean plants. The leaves were sprayed with 50 ml. of a formulation which had the following recipe:

| Agent | Quantity |
| --- | --- |
| $(CH_3)_3CS(CH_2)_8S\overset{\overset{O}{\|}}{C}CH_3$ | 0.1 gram. |
| Acetone | 4.0 ml. |
| Stock emulsifier solution a | 2.0 ml. |
| Distilled water b | 94.0 ml. | a Triton X-155, 0.5 percent by volume in water.

b The concentration of $(CH_3)_3CS(CH_2)_8S\overset{\overset{O}{\|}}{C}CH_3$ was 1,000 parts per million.

After the chemical deposit on the leaves was dry, the paired leaves were separated, and only one of the leaves, selected at random, was used for the test. The leaf was placed onto 1.5 percent water agar and was infested with 10 one-day old Mexican Bean Beetle larvae. The temperature was maintained at 72° F. for 60 hours when mortality and feeding inhibition was determined. Feeding inhibition is an indication of the repellent properties of the test material.

The results in two separate tests showed the 8-(t-butylthio)-1-octyl methanecarbothiolate effectively killed an average of 80 percent of the larvae and showed a substantial feeding inhibition effect.

Reasonable variation and modification of the invention are apparent from the foregoing disclosure and appended claims wherein hydrocarboncarbothiolic acids are reacted with hydrocarbylthioalkenes to provide new hydrocarbylthioalkyl hydrocarboncarbothiolates which may be separated from the reaction mixture and reacted with a base to provide new hydrocarbylthioalkanethiols.

I claim:

1. As a composition of matter, the compound according to the formula $R-S-(CR'_2)_n-CR'H-CR'_2-SH$ wherein R is alkyl, cycloalkyl, aryl, arylalkyl, arylcycloalkyl, alkylcycloalkyl, alkylaryl, cycloalkylalkyl, or cycloalkylaryl having from one to 12 carbon atoms, R' is hydrogen or alkyl having one to six carbon atoms and the total number of carbon atoms in all R' groups does not exceed 20; and $n$ is an integer in the range of two to 12.

2. A composition according to claim 1, 6-(t-butylthio)-1-hexanethiol.

3. A composition according to claim 1, 8-(t-butylthio)-1-octanethiol.

4. A composition according to claim 1, wherein R is alkyl and R' is hydrogen.